US010728315B2

(12) United States Patent
Salkintzis

(10) Patent No.: US 10,728,315 B2
(45) Date of Patent: *Jul. 28, 2020

(54) METHOD AND APPARATUS FOR DISTRIBUTING CONTENT USING A MOBILE DEVICE

(71) Applicant: Motorola Mobility LLC, Chicago, IL (US)

(72) Inventor: Apostolis K. Salkintzis, Athens (GR)

(73) Assignee: MOTOROLA MOBILITY LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/452,925

(22) Filed: Jun. 26, 2019

(65) Prior Publication Data
US 2019/0320011 A1 Oct. 17, 2019

Related U.S. Application Data

(63) Continuation of application No. 15/016,187, filed on Feb. 4, 2016, now Pat. No. 10,341,423.

(60) Provisional application No. 62/199,770, filed on Jul. 31, 2015.

(51) Int. Cl.
G06F 15/16 (2006.01)
H04L 29/08 (2006.01)
(Continued)

(52) U.S. Cl.
CPC ............ *H04L 67/10* (2013.01); *G06Q 50/10* (2013.01); *G06Q 50/30* (2013.01);
(Continued)

(58) Field of Classification Search
CPC combination set(s) only.
See application file for complete search history.

(56) References Cited

U.S. PATENT DOCUMENTS

2012/0311038 A1 12/2012 Trinh et al.
2013/0288668 A1 10/2013 Pragada et al.
(Continued)

OTHER PUBLICATIONS

Golrezaei, Negrin et al.: "Femtocaching and device-to-device collaboration: A new architecture for wireless Video distribution", Communications Magazine, IEEE {vol. 51, Issue 4), Apr. 2013, pp. 142, 149.
(Continued)

*Primary Examiner* — Padma Mundur

(57) ABSTRACT

A server receives, from a first mobile device, a request for content identified by a first resource identifier and a set of presence codes. The set of presence codes includes a presence code for the first mobile device and at least one other presence code for one or more mobile devices in proximity to the first mobile device. The server selects a set of allocated resource identifiers associated with one or more presence codes for one or more of the mobile devices in proximity to the first mobile device having the content cached therein. Each allocated resource identifier in the set is different than the first resource identifier. The server then sends to the first mobile device the set of allocated resource identifiers and associated presence codes for use in retrieving the content cached in at least one of the mobile devices in proximity to the first mobile device.

14 Claims, 6 Drawing Sheets

(51) Int. Cl.

| | | |
|---|---|---|
| *H04W 76/14* | (2018.01) | |
| *H04W 4/80* | (2018.01) | |
| *G06Q 50/30* | (2012.01) | |
| *G06Q 50/10* | (2012.01) | |
| *H04W 84/04* | (2009.01) | |
| *H04W 8/00* | (2009.01) | |

(52) U.S. Cl.
CPC ........... *H04L 67/2842* (2013.01); *H04W 4/80* (2018.02); *H04W 76/14* (2018.02); *H04W 8/005* (2013.01); *H04W 84/042* (2013.01)

(56) References Cited

U.S. PATENT DOCUMENTS

| | | |
|---|---|---|
| 2014/0045511 A1 | 2/2014 | Li et al. |
| 2014/0089378 A1 | 3/2014 | Forrest et al. |
| 2014/0047516 A1 | 10/2014 | Deshpande et al. |
| 2014/0357269 A1* | 12/2014 | Zhou ............ H04W 76/14 455/434 |
| 2015/0149527 A1 | 5/2015 | Forrest et al. |
| 2016/0128123 A1* | 5/2016 | Li ............ H04W 72/08 370/252 |
| 2017/0019495 A1 | 1/2017 | Bennis et al. |
| 2017/0201875 A1* | 7/2017 | Lee ............ G06Q 50/10 |

OTHER PUBLICATIONS

Boccardi, F. et al.: "Five Disruptive Technology Directions for 5G," IEEE Communications Magazine, Feb. 2014, pp. 74-80.

Monserrat, J. et al.: "Rethinking the Mobile and Wireless Network Architecture, The METIS Research into 5G," 2014 European Conference on Networks and Communications (EuCNC), all pages.

Lin, X. et al.: "An Overview of 3GPP Device-to-Device Proximity Services," IEEE Communications Magazine, Apr. 2014, pp. 40-48.

* cited by examiner

METHOD AND APPARATUS FOR DISTRIBUTING CONTENT USING A MOBILE DEVICE

RELATED APPLICATIONS

The present application is related to and claims benefit under 35 U.S.C. § 119(e) from U.S. Provisional Patent Application Ser. No. 62/199,770, filed Jul. 31, 2015, titled "Methods and Apparatus for Distributing Content using a Mobile Device", which is commonly owned with this application by Motorola Mobility LLC, the entire contents of which are incorporated herein by reference.

FIELD OF THE DISCLOSURE

The present disclosure relates generally to content distribution within a network and more particularly to methods and apparatus for facilitating secondary distribution of content from a server using a mobile device.

BACKGROUND

5th generation (5G) mobile networks and wireless systems denote the next major phase of mobile telecommunications standards beyond the current 4G standards. Expected features of 5G networks include the capability of supporting large numbers of wireless devices, including smartphones and machine-to-machine devices, and pervasive distribution of high definition (HD) media, also referred to herein interchangeably as content. Such features will inevitably generate a significant amount of network traffic load, for instance from large numbers of devices requesting HD video streaming from media servers. One solution, which can lead to increased cost and network complexity, is to provision networks with higher capacity radio and wireline links and higher capacity routing nodes. However, lower cost solutions must also be explored, particularly solutions that offload at least some of the content distribution from the network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
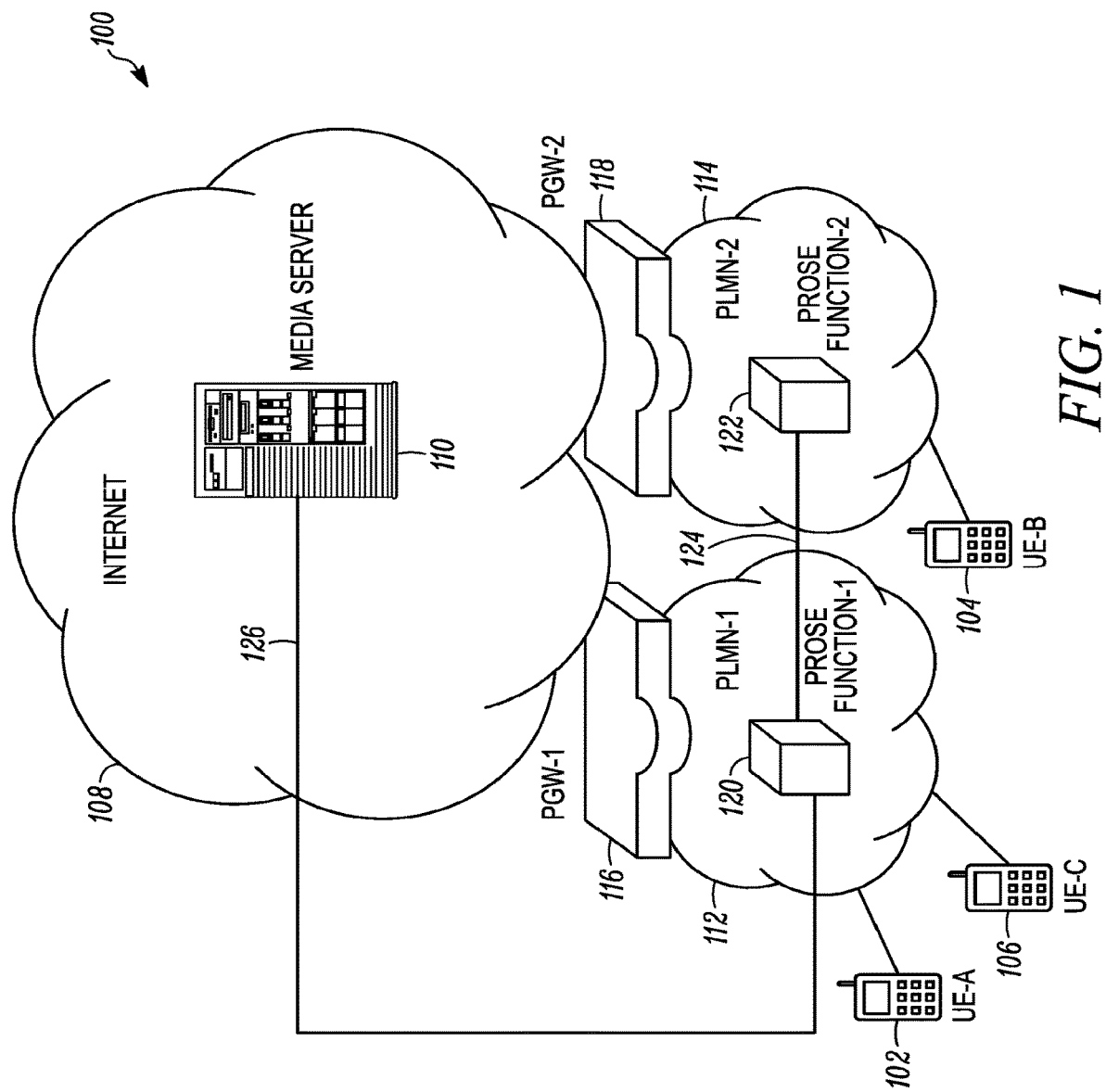
FIG. 1 is a schematic diagram illustrating an environment that supports distributing content using a mobile device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Pursuant to the various embodiments are methods and apparatus for facilitating secondary distribution of content from a server using a mobile device. For example, a first wireless communication device, such as a mobile device, sends to a server a request for content identified by a first resource identifier. The request for content also includes a first presence code that indicates proximal presence of the first wireless communication device without identifying a user of the first wireless communication device. In response thereto, the server sends the content to the first wireless communication device for caching and also sends to the first wireless communication device a second allocated resource identifier that is different from the first resource identifier. The second allocated resource identifier can be used to authorize other wireless communication devices to retrieve the cached content from the first wireless communication device (also referred to herein as secondary distribution), for instance over a direct wireless, e.g., peer-to-peer or device-to-device, connection.

As indicated, the disclosed embodiments allow offloading of media distribution from the media server and also from the network, wherein peer-to-peer connections are used to retrieve the content from a wireless communication device having the content cached therein. Moreover, since the requesting wireless communication device is only associated in the content request with a presence code that has no user specific information, user equipment (UE) and user identities or other sensitive information need not be disclosed to a third party server to effectuate the secondary content distribution. It should be noted that the acronym "UE" is used in both the singular and the plural, herein, depending on the context.

FIG. 1 illustrates a schematic diagram of an example environment 100 within which may be implemented methods and devices for distributing content using a mobile device, in accordance with the present teachings. As illustrated, environment 100 includes a public land mobile network (PLMN)-1 112, a (PLMN)-2 114, the Internet 108, a media server 110 within the Internet 108, and three mobile devices or UE, namely a UE-A 102, a UE-B 104, and a UE-C 106.

As described, the devices within the environment 100 operate in accordance with, consistent with, and are in one or more ways compatible with 3$^{rd}$ Generation Partnership Project (3GPP) standards or technical specifications (TS). Accordingly, the PLMNs 112 and 114 are 3GPP networks containing network elements that are configured to operate and communicate within and/or external to the network according to one or more 3GPP TSs, such as Long-Term Evolution (LTE) networks. Likewise, the mobile devices 102, 104, and 106 are also configured to communicate with each other and/or one or more network elements using 3GPP TSs. However, this communication environment 100 implementation is meant only to serve as an example but in no way limit the disclosed embodiments, which might alternatively be implemented using other types of network deployments and associated communication protocols.

The UE 102, 104, 106 can be representative of a variety of mobile devices or user equipment, also referred to herein generally as user devices, including, for example, cellular telephones, personal digital assistants (PDAs), smart phones, laptop computers, tablets, phablets, or other hand-held or portable electronic devices. As shown, the UE are each configured to establish links or connections, for instance wireless links, to one of the networks 112 or 114. For an embodiment, a mobile device user is a cellular subscriber of a PLMN that offers proximity services (ProSe) that enables device discovery and device-to-device communication, e.g. according to 3GPP TS 23.303.

Particularly, proximity services enable a user's mobile device to announce its presence using a presence code. The presence code enables another device to detect proximal presence of the mobile device that sent the presence code without being made aware of the identity of the user or the mobile device. For the 3GPP embodiment, the presence code is referred to herein as a proximity-related services code (or "ProSe code") and is further referred to in the 3GPP specification as a "ProSe App Code" because each code can be related with an application such as Facebook, Twitter, etc. As used herein, "proximity," "close proximity," and "proximal" denote that two devices are close enough to at least receive presence codes that are transmitted, e.g., broadcasted, and can denote physical and/or communicative proximity.

For purposes of the present description, it is assumed that a user of the UE-B 104 is a subscriber of the (PLMN)-2 114, and both the users of the UE-A 102 and the UE-C 106 are subscribers of the (PLMN)-1 112. Accordingly, as shown, the UE-A and UE-C can establish a wireless link with a network element in the (PLMN)-1 112 (in this case a ProSe Function-1 120) to receive a ProSe code, e.g., a ProSe Code-A and a ProSe Code-C, respectively. Likewise, the UE-B can establish a wireless link with a network element in the (PLMN)-2 114 (in this case a ProSe Function-2 122) to receive a ProSe code, e.g., a ProSe Code-B. For a particular embodiment, the UE 102, 104, and 106 send, namely broadcast, their ProSe codes over direct wireless links using a wireless peer-to-peer (P2P) or device-to-device (D2D) technology such as LTE-Direct (also known as LTE-D2D), Wi-Fi-Direct, Wi-Fi Aware, or Bluetooth low energy (BLE).

The following elements are further included within the PLMNs 112 and 114, although not shown. More particularly, each PLMN includes an access network, which can use any type of radio access technology (RAT) for a UE to access and communicate using the PLMN. The access networks can be cellular access networks or cellular networks, having at least one cellular tower or base station for facilitating the establishment of wireless links by user devices to the access networks. For a 3GPP network embodiment, the cellular networks can include Evolved UMTS Terrestrial Radio Access Networks (E-UTRANs) or legacy UTRANs having at least one eNodeB or NodeB for facilitating wireless links for UE such as the UE 102, 104, and 106.

Notwithstanding, any other cellular or cellular-based access technology can be used. Such technologies include, but are not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Universal Mobile Telecommunication System (UMTS), Wideband CDMA (WCDMA), etc., or variants thereof.

The PLMNs 112 and 114 also include a core network. The core networks that support the E-UTRANs and UTRANs cellular networks are, correspondingly, System Architecture Evolution (SAE) cores, also referred to in the art as Evolved Packet Cores (EPCs). The EPC subcomponents include a Packet Data Network (PDN) Gateway (PGW), e.g., a PGW-1 116 in (PLMN)-1 112 and a PGW-2 118 in (PLMN)-2 114. The PGWs serve as a point of interconnect between the EPC and external Internet Protocol (IP) networks, such as the Internet 108, to route packets between the PDNs. Other EPC subcomponents (not shown) can include, a Mobility Management Entity (MME), a Serving Gateway (S-GW), a Home Subscriber Server (HSS), etc.

The Internet 108 represents a system of interconnected computer networks that use the standard Transmission Control Protocol (TCP)/IP suite. One example computer network is a network operated by a media service provider, which includes one or more media servers, e.g., the media server 110. The media server 110 stores and shares media or content including, but not limited to, videos such as YouTube videos or movies, audio such as music, picture files, or other static and/or dynamic content, some of which can be HD media. In one example, the media server 110 is an origin server, which holds the original content. For another example, the media server 110 is an edge server in a Content Distribution Network (CDN), which holds a cached copy of the original content. Moreover, for a particular embodiment, the UE and media server use Hypertext Transfer Protocol (HTTP) for content identification and transfer.

Additionally, although not shown, environment 100 can further include other networks coupled to and supported by the core networks and accessible to UE 102, 104, and 106. Such networks include, for example: one or more PDNs or one or more Wireless Local Area Networks (WLANs). The WLANs have at least one access point for facilitating wireless links using, for instance, Institute of Electrical and Electronics Engineers (IEEE) 802.11 standards, also referred to in the art as Wi-Fi technology, or using Worldwide Interoperability for Microwave Access (WiMax) technology. A PDN can be, for instance, an enterprise network, an IP Multimedia Subsystem (IMS), etc.

Figure 2:
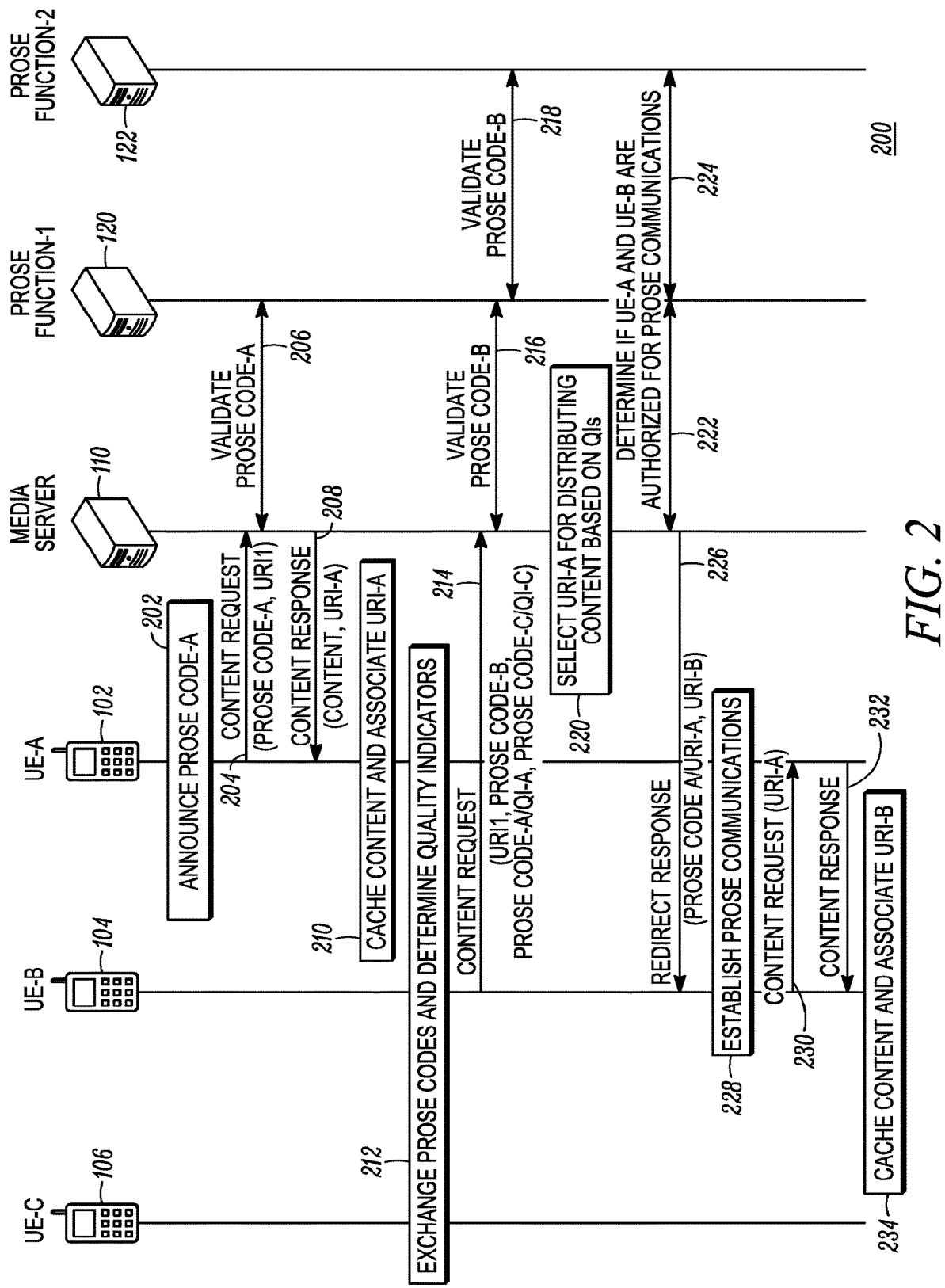
FIG. 2 is a message sequence diagram illustrating collaborative functionality and messaging for distributing content using a mobile device in accordance with an embodiment.

FIG. 2 depicts a message sequence diagram 200 illustrating collaborative functionality and messaging for distributing content using a mobile device, consistent with the present teachings. Diagram 200 shows functionality being performed in at least one device and messages being exchanged between two or more of the devices of: UE-A 102, UE-B 104, UE-C 106, the media server 110, the ProSe Function-1 120, and the ProSe Function-2 122. The functionality and message exchanges can be in accordance with any suitable protocol either standard or proprietary including, but not limited to, OAuth protocol, HTTP, IP, etc. It should be further understood that each "massage exchange" depicted in all the message sequence diagrams described herein can be performed using one or more messages sent between the relevant devices. Moreover, information being sent or received with other information, requests, etc. does not limit the information, requests, etc. to being sent in a single message.

For purposes of implementation scenarios described herein, UE 102, 104, and 106 are all authorized to perform ProSe announcement in specific LTE-D2D radio resources or channels. This authorization can be pre-configured in the UE or provided with OMA-DM or a similar protocol. For example, the 3GPP specifications in TS 24.334 clause 5.1.1 define that OMA-DM is used for provisioning UE with ProSe authorization data, including the PLMNs in which a UE can perform monitoring and/or announcing. Moreover, it is assumed that for this embodiment, UE 102, 104, and 106 perform the Announce Request procedure as described in TS 23.303 and, thereby, each receive a ProSe code from a ProSe function via a PC3 interface. Namely, UE-A 102 receives ProSe Code-A from ProSe Function-1 120. UE-B 104 receives ProSe Code-B from ProSe Function-2 122, and UE-C 106 receives ProSe Code-C from ProSe Function-1 120. As mentioned earlier, a ProSe Code does not contain any UE or user identities and, thus, cannot be used by a receiving device to derive sensitive UE or user information.

UE 102, 104, and 106 can now announce or broadcast their respective ProSe codes in the appropriate D2D radio channels in order to announce their presence to devices in close proximity. For one embodiment, these codes are transmitted in the clear. Moreover, each code includes: a pseudo-random value called a temporary id in 3GPP specs; a PLMN identity; and a message integrity code (MIC), as specified in 3GPP TS 33.303. The MIC is used to integrity protect and validate the ProSe codes and make sure they are not transmitted by malicious UE. A MIC value can be, for instance, derived in the UE by hashing the allocated ProSe code and a 128-bit discovery key as specified in 3GPP TS 33.303. The discovery key is sent to UE during the Announce Request procedure.

At a point in time, UE-A 102 announces 202 ProSe Code A. However, it is assumed that during this time, neither UE-B 104 nor UE-C 106 is in proximity to UE-A 102. Also during this time, UE-A 102 sends a content request message 204 to the media server 110 for content identified by a resource identifier. For example, the content request message 204 is an HTTP GET message used to request a HD video file identified by a Uniform Resource Identifier (URI), e.g., URI1. Additionally, the content request message 204 contains ProSe Code-A for UE-A 102.

For an embodiment, when the media server 110 receives the content request message 204 with the URI1 and ProSe Code-A, the media server 110 detects the PLMN identity as PLMN-1 112 from the ProSe Code-A and contacts 206 the ProSe Function-1 120 to validate the ProSe Code-A. In this illustrative scenario, a media service operator has a business agreement with a PLMN-1 operator that authorizes the media server 110 to communicate with ProSe Function-1 120 over an interface 126. For one example, the interface 126 is similar to a PC2 interface specified in 3GPP TS 23.303 but includes enhanced functionality not currently supported in the 3GPP TSs, which allows the exchange of messaging 206 for the ProSe Function-1 120 to validate a ProSe code for the media server 110. For a particular embodiment, once ProSe Code-A has been validated, messaging 206 is not repeated if UE-A 102 subsequently requests different content from the media server 110.

The ProSe Function-1 120 validates ProSe Code-A by using its MIC value and an associated Discovery Key. The Discovery Key is available at ProSe Function-1 120, which previously assigned the ProSe code to UE-A. Validating the ProSe Code-A is useful in that it helps prevent malicious UE from providing arbitrary ProSe codes to the media server 110. If the validation fails, the media server 110 simply provides to UE-A 102 a content response that includes the requested content, or the media server 110 may ignore the content request 204. However, upon successfully validating the ProSe Code-A (e.g., receiving an indication from the ProSe Function-1 120 that the ProSe Code-A is valid) the media server 110 sends a content response message 208 that includes the requested content as well as an allocated resource identifier, e.g., URI-A, which is different from the URI1 that UE-A 102 included in the content request message 204. UE-A 102 can then cache or store 210 the content and associate the cached content with the URI-A resource identifier and may also present the content on a display for viewing by a user of UE-A 102.

For example, the content response message 208 is an HTTP 200 OK message. For a particular embodiment, the content response message 208 also indicates to UE-A 102, for instance using a cache-control header, that the requested content is cacheable, meaning that UE-A 102 can cache it for some duration or lifetime. The URI-A included in the content response message 208 essentially authorizes receipt, by another device, of the cached content associated with this allocated URI. Accordingly, if another device were to request the content cached at 210 using another URI (including the URI1 that the UE-A 102 provided to the media server 110), the UE-A 102 would not provide the cached content. Devices can only retrieve the content cached at 210 using the allocated URI-A, thereby providing a controlled mechanism for offloading media distribution from the media server 110 and from the PLMNs.

Assume now that UE-B 104 and UE-C 106 are in close proximity with UE-A 102 as shown in FIG. 1 and, along with UE-A 102, are also announcing their respective ProSe codes. As such, at 212: UE-A 102 receives ProSe Code-B from UE-B 104 and ProSe Code-C from UE-C 106; UE-B 104 receives ProSe Code-A from UE-A 102 and ProSe Code-C from UE-C 106; and UE-C 106 receives ProSe Code-B from UE-B 104 and ProSe Code-A from UE-A 102.

Additionally, for this embodiment, at 212, the UE determine or derive a quality indicator (QI) associated with each device from which it received a ProSe code. The QI indicates an expected quality of communication between the device receiving a ProSe code and the device sending the ProSe code. For one example, the QI corresponds to, is derived from, is a function of, etc., the received signal strength of the received ProSe announcement such that QI values indicating a higher quality of communications are derived for announcing UE that are closer to the receiving UE. Accordingly, at 212: UE-A 102 determines QIs for UE-B 104 and UE-C 106; UE-B 104 determines QIs for UE-A 102 (e.g., QI-A) and UE-C 106 (e.g., QI-C); and UE-C 106 determines QIs for UE-B 104 and UE-A 102.

Subsequently, UE-B 104 sends a content request message 214, e.g., an HTTP GET message, to the media server 110 to request the content identified using URI1. For this embodiment, besides the URI1, the content request message 214 also contains a set of one or more ProSe codes, which includes ProSe Code-B and the ProSe codes of any proximal UE along with the QIs determined for the proximal UE. Accordingly, the content request message 214, along with ProSe Code-B for the UE-B 104, also contains the ProSe Code-A with the associated QI-A and the ProSe Code-C with the associated QI-C.

Upon receiving the content request message 214, and if it has not already done so, the media server 110 validates ProSe Code-B to determine whether to respond with the content or redirect the UE-B 104 to receive the content directly from another mobile device. In this case, let's assume that the media server operator does not have a business agreement with the operator of PLMN-2 114. Thus, the media server 110 does not have an interface to the ProSe Function-2 122. Accordingly, when the media server 110 detects the PLMN identity for the ProSe Code-B as PLMN-2 114, the media server 110 contacts 216 the ProSe Function-1 120 to validate the ProSe Code-B. ProSe Function-1 120 then contacts 218 ProSe Function-2 122 over an interface 124 to validate the ProSe Code-B, which ProSe Function-2 122 can do using the MIC value. For one example, the interface 124 is similar to a PC6 interface specified in 3GPP TS 23.303 but includes enhanced functionality not currently supported in the 3GPP TSs, which allows the exchange of messaging 218 for the ProSe Function-2 122 to validate a ProSe code for the ProSe Function-1 120.

If validation fails, the media server 110 simply sends UE-B 104 the requested content for caching, or the media server 110 may ignore the content request 214. However, upon successful validation of ProSe Code-B, the media server 110 can proceed to offload, to a non-network device, distribution of the requested content associated with the URI1. In this case, the media server 110 selects 220 UE-A 102, which was allocated URI-A, for distributing the requested content to UE-B 104. More particularly, the media server 110 determines which of the UE having ProSe codes included in the content request message 214 has a fresh, i.e., the lifetime hasn't expired, cached copy of the requested content. The media server 110 can do this by determining whether any of these UE has been allocated a resource identifier, other than URI1, associated with the requested content.

For one implementation scenario, the media server 110 determines that only the UE having ProSe Code-A has a fresh cached copy of the requested content. For another implementation scenario, the media server 110 determines that both the UE having ProSe Code-A and the UE having ProSe Code-C have a fresh cached copy of the requested content. In the latter case, the media server 110 can select the "best" UE between these two UE for redirecting the content request based on the QIs provided with their ProSe codes. For example, the media server 110 determines that the UE associated with ProSe Code-A 102 would be the best UE for redirecting the content request since QI-A indicates that the expected quality of communications with the associated UE would be better than the expected quality of communications with the UE associated with the QI-C.

For a further embodiment, not all UE that are allocated valid ProSe codes are authorized to perform ProSe D2D communications, for instance based on their subscriptions. Namely, ProSe D2D communication may be allowed with some UE but not with others. Accordingly, the media server 110 determines if UE-A 102 and UE-B 104 are authorized for ProSe communications. For an embodiment, this determination can be skipped if the media server 110 has already determined such authorization and stored the results. Again, since the media server 110 is only authorized to communicate with the ProSe Function-1 120, this determination involves messaging 222 between the media server 110 and the ProSe Function-1 120 over the interface 126 as well as messaging 224 between the ProSe Function-1 120 and the ProSe Function-2 122 over the interface 124. For example, the ProSe Function-1 120 has access to subscription and other sensitive information for a user of UE-A 102, which was allocated ProSe Code-A, to determine whether UE-A 102 is authorized for ProSe D2D communications. Likewise, the ProSe Function-2 122 has access to subscription and other sensitive information for a user of UE-B 104, which was allocated ProSe Code-B, to determine whether UE-B 104 is authorized for ProSe D2D communications.

For one embodiment, where either UE-A 102 or UE-B 104 is unauthorized for ProSe communication, the media server 110 simply sends the requested content to UE-B 104. If both UE-A 102 and UE-B 104 are authorized for ProSe communication, the media server 110 sends a redirect response message 226 to the UE-B 104 to redirect the UE-B 104 to instead retrieve the requested content, using the URI-A, from the UE associated with the ProSe Code-A. Accordingly, the redirect response message 226 includes the URI-A and associated ProSe Code A. The URI-A is used to prevent malicious UE from retrieving content from nearby caches (UE) when they are not authorized by the network to perform ProSe communication. Indeed, UE-B 104 can request and received the cached content from UE-A 102 only if UE-B 104 knows the URI-A, which is the allocated URI that corresponds to the content cached at 210. For a particular embodiment, the redirect response message 226 is a Temporary Redirect message supported by HTTP version 1.1.

For this illustrated embodiment, the redirect response message 226 also includes a URI-B allocated to UE-B 104 to authorize other devices to retrieve from UE-B 104 the cached content associated with URI1. The URI-B is necessarily different from URI1 but can be the same or different from URI-A allocated to UE-A 102 or a URI-C allocated to UE-C 106, depending on the allocation mechanism used by the media server 110.

Upon receiving the redirect response message 226 with the URI-A, the UE-B 104 establishes 228 D2D ProSe communication with the UE that announced ProSe Code-A, in this case UE-A 102. Any suitable methods can be used to establish 228 the ProSe communication including, but not limited to, LTE Direct, Wi-Fi Direct, Wi-Fi Aware, Bluetooth, etc., whereby in one example, the UE-B uses the ProSe Code-A to establish the D2D ProSe communication with the UE-A. Using the D2D link, the UE-B 104 sends a content request message 230, e.g., a HTTP GET message, directly to UE-A 102, which contains the URI-A. Since the UE-A 102 has associated the URI-A with the content cached at 210, the UE-A 102 sends a content response message 232, e.g., a HTTP 200 OK message, which directly provides this content to UE-B 104. UE-B 104 then caches 234 the content and associates the content with URI-B allocated by and received from the media server 110.

Figure 3:
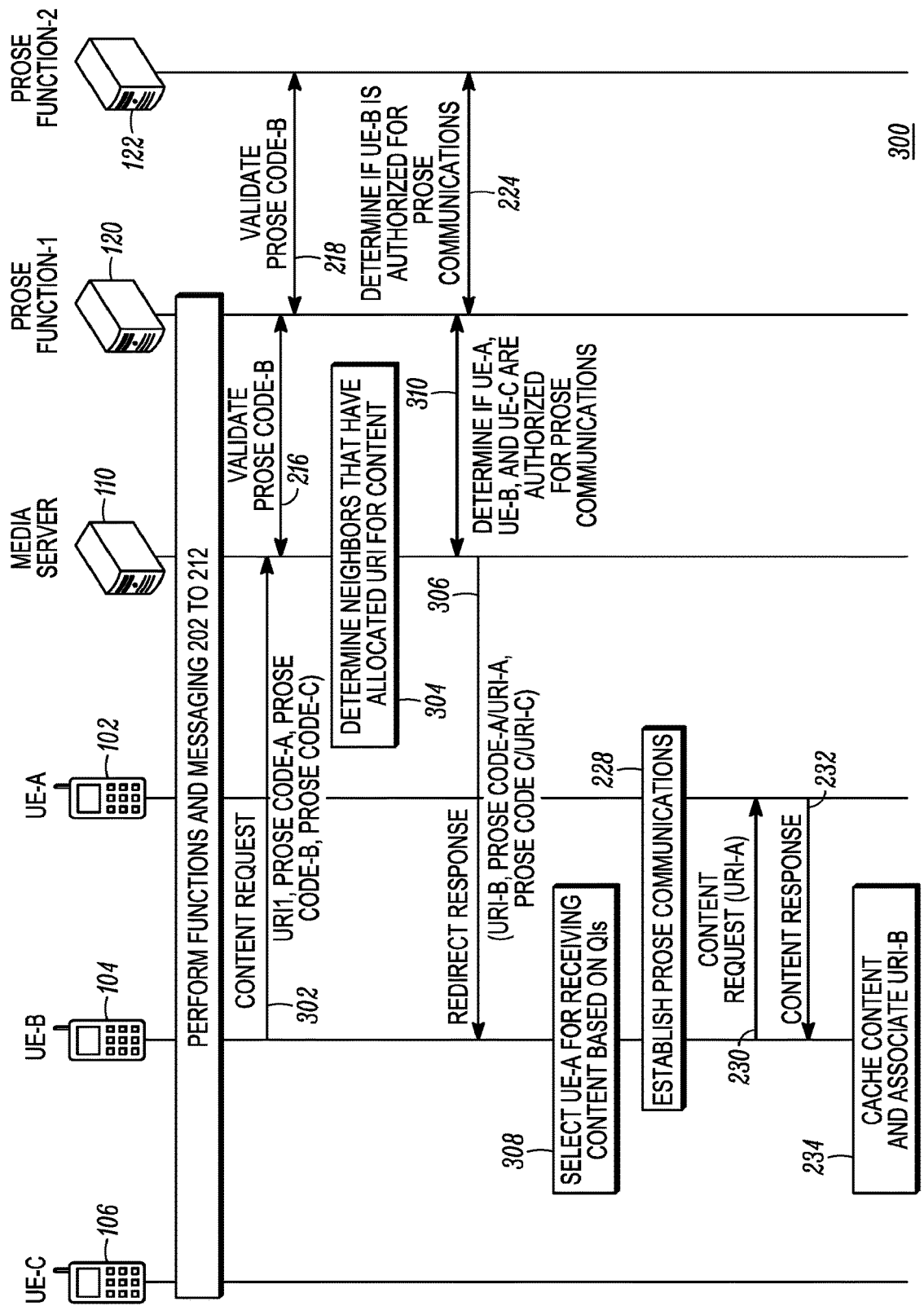
FIG. 3 is a message sequence diagram illustrating collaborative functionality and messaging for distributing content using a mobile device in accordance with another embodiment.

FIG. 3 depicts a message sequence diagram 300 illustrating collaborative functionality and messaging for distributing content using a mobile device, consistent with the present teachings. Diagram 300 shows functionality being performed in at least one device and messages being exchanged between two or more of the devices of: UE-A 102, UE-B 104, UE-C 106, the media server 110, the ProSe Function-1 120, and the ProSe Function-2 122. The functionality and message exchanges can be in accordance with any suitable protocol either standard or proprietary including, but not limited to, OAuth protocol, HTTP, IP, etc.

For a particular implementation scenario, devices 102, 104, 106, 110, and 120 collaboratively perform functionality and messaging 202, 204, 206, 208, 210, and 212 as described above. Accordingly, the media server 110 has allocated URI-A to UE-A 102 as described above, and the UE 102, 104, and 106 have announced and received one another's ProSe codes, with the exception that at 212 the UE need not determine the QIs associated with each UE from which it received a ProSe code.

Accordingly, in this embodiment, when the UE-B 104 sends to the media server 110 a content request message 302 requesting content identified by the URI1, the message 302 contains the set of ProSe codes (e.g., the ProSe Code-A, ProSe Code-B, and ProSe Code-C) without the QI. As before, the media server 110 can validate the ProSe Code-B using the messaging 216 and 218. Once the ProSe Code-B is successfully validated or verified, the media server 110 determines 304 which of the neighbors (i.e., devices for which UE-B 104 provided the ProSe codes) have been allocated a special URI for the requested content, which in this example scenario is the UE associated with ProSe Code-A and the UE associated with ProSe Code-C. For an embodiment, using messaging 310 and 224 the media server 110 determines which of UE-A, UE-B, and UE-C are authorized to perform ProSe communication. Similar to with ProSe Code-A and ProSe Code-B, the media server 110 can also validate the ProSe Code-C, for instance using messaging 310, if such validation has not already occurred. It is assumed that all three UE are authorized for ProSe communication such that UE-B can retrieve the content either from UE-A or from UE-C. Alternatively, if the media server determines that UE-A, for instance, is not authorized for direct communication, the media server 110 will request UE-B to retrieve the content from UE-C.

The media server 110 sends a redirect response message 306 to the UE-B 104 that includes the URI-A and associated ProSe Code-A (for UE-A 102), the URI-C and associated ProSe Code-C (for UE-C 106), and the URI-B. At 308, the UE-B 104 determines the QIs for communications with the UE announcing ProSe Code-A and ProSe Code-C and selects a UE for retrieving the requested content based on the QI. In this case, the UE-B 104 selects the UE announcing ProSe Code-A (e.g., UE-A) for retrieving the requested content. UE-B 104 establishes 228 D2D ProSe communications with the UE that announced ProSe Code-A, in this case UE-A 102. Using the D2D link, the UE-B 104 sends the content request message 230 directly to UE-A 102, which contains the URI-A. Since the UE-A 102 has associated the URI-A with the content cached at 210, the UE-A 102 sends a content response message 232 that directly provides this content to UE-B 104. UE-B 104 then caches 234 the content and associates the content with URI-B allocated by and received from the media server 110.

Figure 4:
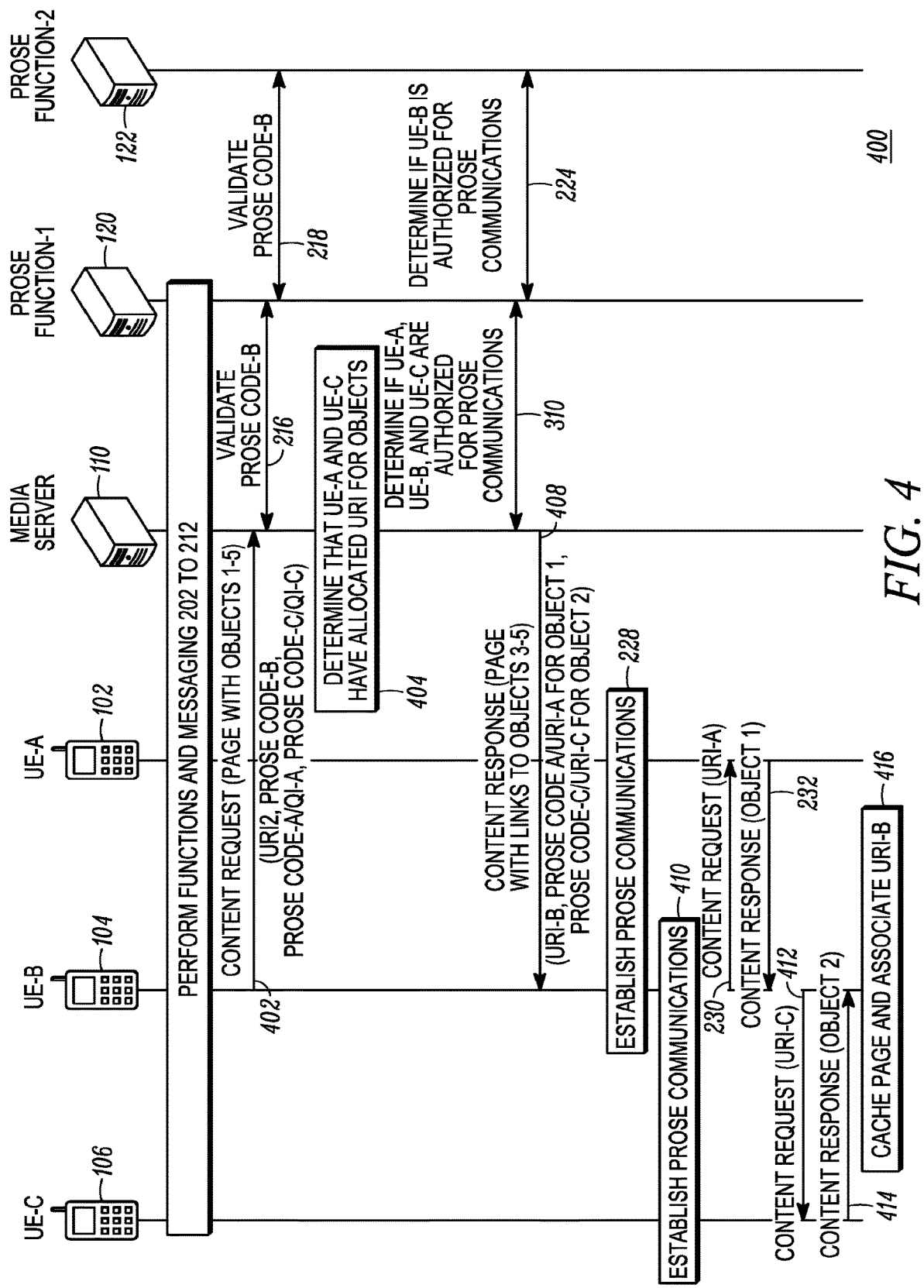
FIG. 4 is a message sequence diagram illustrating collaborative functionality and messaging for distributing content using a mobile device in accordance with another embodiment.

FIG. 4 depicts a message sequence diagram 400 illustrating collaborative functionality and messaging for distributing content using a mobile device, consistent with the present teachings. Diagram 400 shows functionality being performed in at least one device and messages being exchanged between two or more of the devices of: UE-A 102, UE-B 104, UE-C 106, the media server 110, the ProSe Function-1 120, and the ProSe Function-2 122. The functionality and message exchanges can be in accordance with any suitable protocol either standard or proprietary including, but not limited to, OAuth protocol, HTTP, IP, etc.

For a particular implementation scenario, devices 102, 104, 106, 110, and 120 collaboratively perform functionality and messaging 202, 204, 206, 208, 210, and 212 as described above. Accordingly, the media server 110 has allocated URI-A to UE-A 102 as described above, and the UE 102, 104, and 106 have announced and received one another's ProSe codes as well as determined the QIs associated with each UE from which it received a ProSe code. Moreover, the content that UE-A 102 requested, received, cached, and associated with the URI-A is an object, e.g., Object 1. An object, as used herein, refers to any content such as video content, audio content, etc.

UE-B 104 sends a content request message 402 to the media server 110 to request content identified using URI2, which is content that refers to the content identified by the URI1. For this embodiment, the URI2 identifies a web page that contains links to or has embedded therein Objects 1 to 5, for instance with each object being identified by a different URI. Besides the URI2, the content request message 402 contains a set of one or more ProSe codes, which includes ProSe Code-B and the ProSe codes of any proximal UE along with the QIs determined for the proximal UE. Accordingly, the content request message 402 along with ProSe Code-B for the UE-B 104 also contains the ProSe Code-A with the associated QI-A and the ProSe Code-C with the associated QI-C. As before, the media server 110 can validate the ProSe Code-B using the messaging 216 and 218.

Once the ProSe Code-B is validated or verified, the media server 110 determines 404 which of the neighbors (i.e., devices for which UE-B 104 provided the ProSe codes) have been allocated a special URI for any of the Objects 1 to 5 and of those neighbors, which is the best neighbor for offloading content distribution based on the QIs provided. The determining 404 could be very useful where UE-B 104 is in proximity to many other devices at varying levels of quality of communication, many of which have already cached objects that the UE-B 104 has requested. For this simplified scenario, the media server 110 selects the UE associated with ProSe Code-A for distributing the Object 1 and the UE associated with ProSe Code-C for distributing the Object 2. For an embodiment, using messaging 310 and 224 the media server 110 determines which of UE-A, UE-B, and UE-C are authorized to perform ProSe communication. Similar to with ProSe Code-A and ProSe Code-B, the media server 110 can also validate the ProSe Code-C, for instance using messaging 310, if such validation has not already occurred. It is assumed that all three UE are authorized for ProSe communication such that UE-B can retrieve the Object 1 from UE-A and Object 2 from UE-C. Alternatively, if the media server 110 determines that UE-A, for instance, is not authorized for direct communication, the media server 110 will request UE-B to retrieve only Object 2 from UE-C.

The media server 110 sends a content response message 408 to the UE-B 104 having the URI-B and the web page content that includes, as a link for Object 1, the URI-A associated with ProSe Code-A (for UE-A 102) and, as a link for Object 2, the URI-C associated with ProSe Code-C (for UE-C 106). To retrieve the content of Object 1 and Object 2, after receiving the response message 408, the UE-B requests this content from UE-A 102 and UE-C 106 by using URI-A and URI-C, respectively. The content response message 408 also includes the links for Objects 3-5, which are also embedded content to the page request in content request 402. However, since Objects 3-5 are not cached in a UE in close proximity to UE-B 104, the links for these objects point to content that cannot be retrieved from UE-A or UE-C, but instead points to content in the media server 110 or to any other content provider or non-mobile device entity on the Internet 108. In other words, the distribution of Objects 3-5 is not offloaded to another device.

Accordingly, UE-B 104 establishes 228 D2D ProSe communication with the UE that announced ProSe Code-A, in this case UE-A 102, and establishes 410 D2D ProSe communication with the UE that announced ProSe Code-C, in this case UE-C 106. Using the D2D link, the UE-B 104 sends the content request message 230 directly to UE-A 102, which contains the URI-A, and receives the Object 1 in the content response message 232. Similarly, using the D2D link, the UE-B 104 sends a content request message 412 directly to UE-C 106, which contains the URI-C, and receives the Object 2 in a content response message 414. UE-B 104 then caches 416 the content (e.g. the web page) received in response 408 and associates this content with URI-B allocated by and received from the media server 110.

Figure 5:
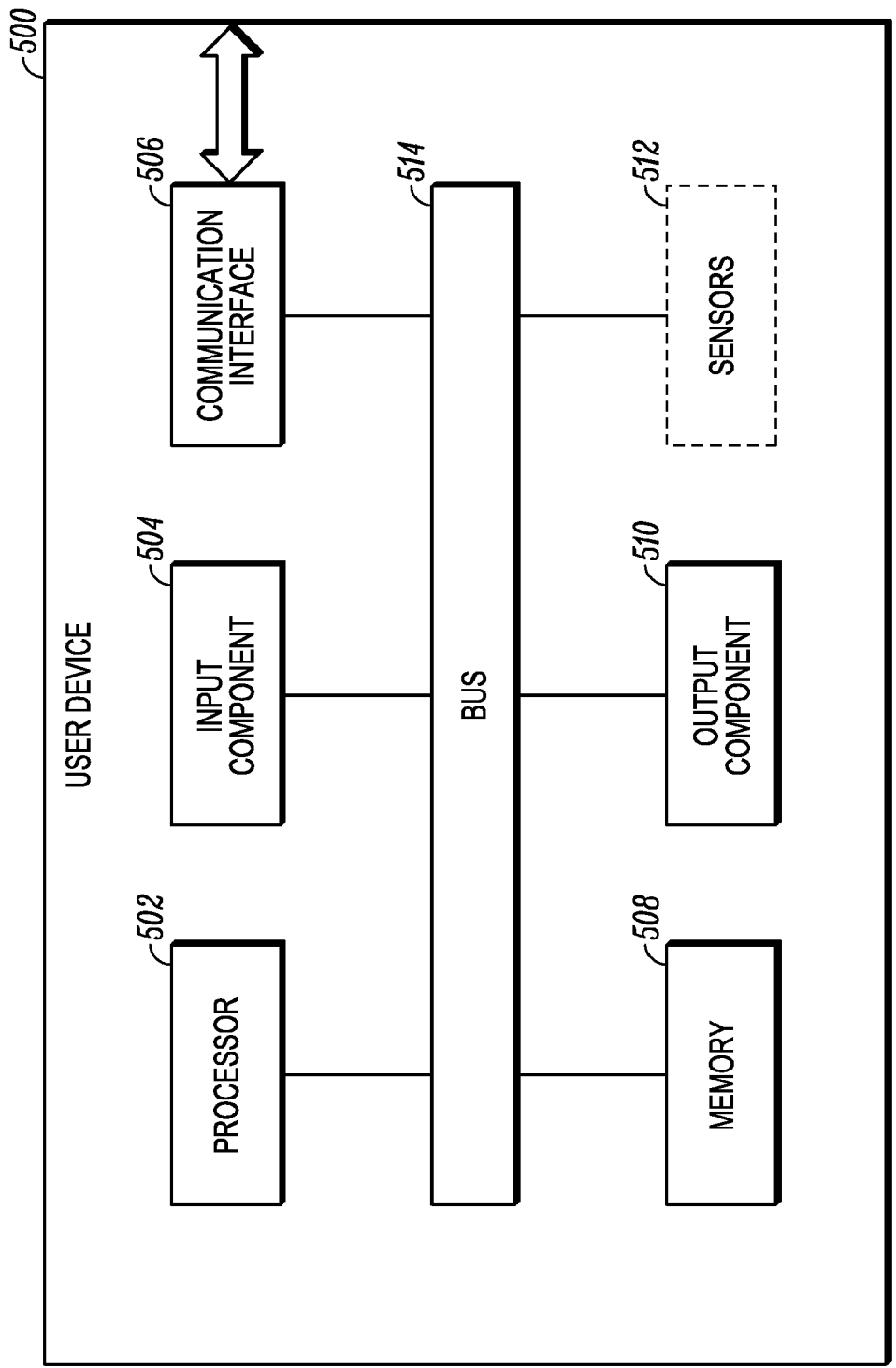
FIG. 5 is a block diagram illustrating internal hardware components of a user device configurable in accordance with some embodiments.

FIG. 5 shows a block diagram illustrating example internal hardware components of a user device 500, for example UE 102, 104, and 106 as illustrated in FIG. 1, which can be configured to facilitate implementation of embodiments according to the present teachings. "Adapted," "operative," "capable" or "configured," as used herein, means that the indicated device or components are implemented using one or more hardware elements, which may or may not be programmed with software and/or firmware as the means for the indicated components to implement their desired functionality.

As shown in FIG. 5, the internal hardware elements or components of the device 500 include at least one of each of a processor 502, an input component 504, a communication interface 506, a memory component 508, an output component 510, and optionally a set of sensors 512, for instance where device 500 is a portable device. As further illustrated, the internal components of the device 500 are operatively coupled to one another, and in communication with one another, by way of one or more internal communication links 514, for instance an internal bus.

A limited number of device components 502, 504, 506, 508, 510, 512, and 514 are shown for ease of illustration, but other embodiments may include a lesser or greater number of such components in the device 500. Moreover, other well-known elements needed for a commercial embodiment of the device 500 may be omitted from FIG. 5 for brevity. Additionally, the user device 500 is configurable through one or more of its device components 502, 504, 506, 508, 510, 512, and 514 to operate, for instance, as a UE in accordance with the embodiments described above by reference to the message sequence diagrams 200, 300, and 400 illustrated in FIGS. 2, 3, and 4.

We now turn to a brief description of the components within the schematic diagram 500. The communication interface 506 allows for communication between the user device 500 and other electronic devices, such as a ProSe server, a media server, or another user device. For one embodiment, the communication interface 506 includes one or more wireless transceivers such as a cellular transceiver, a WLAN transceiver, and a Global Positioning System (GPS) transceiver. More particularly, the cellular transceiver is configured to implement any suitable cellular or cellular-based technology to conduct cellular communications of data over a cellular network. The WLAN transceiver can be a Wi-Fi transceiver configured to conduct Wi-Fi communications over a Wi-Fi network, in accordance with the IEEE 802.11 (a,b, g, n, or ac) standard. The communication interface 506 can also include one or more wireless transceivers configured to implement P2P communications using technology such as LTE Direct, Wi-Fi Direct, Wi-Fi Aware, BLE, etc. Where, for instance, the device 500 is a fixed device, the communication interface 506 can include a wired communication interface used to communicate through a cable modem or a digital subscriber line (DSL).

The processor 502 includes arithmetic logic and registers necessary to perform the digital processing required by the device 500 to, for example, facilitate secondary distribution of media from a server in a manner consistent with the embodiments described herein. For one embodiment, the processor 502 represents a primary microprocessor or central processing unit (CPU) of the device 500 such as an application processor of a smartphone. In another embodiment, the processor 502 represents a baseband processor or other ancillary or standalone processor to the CPU that is used by one or more wireless transceivers. Depending, at least in part, on the particular function being performed and a given device 500 design, various functionality or protocols may be executed by the processor 502 in hardware or as software or firmware code.

For one example, the processor 502 implements a protocol stack or protocol suite having multiple "layers" that each have, include, contain, or implement one or more protocols, procedures, and/or algorithms that enable various functionality of the device 500. One such layer is an application layer that contains or implements various applications installed on the device 500 including, but not limited to, an Internet Protocol multimedia subsystem (IMS)-based application that supports voice or video over IP, an application that communicates with a ProSe server, etc.

For an embodiment, the input component 504 includes: one or more visual input components such as a camera lens and photosensor; one or more acoustic receiver or audio input components such as one or more transducers (e.g., microphones); and one or more mechanical input components such as a touchscreen display, a flip sensor, a keyboard, a keypad selection button, and/or a switch. Moreover, the output component 510 can include: one or more visual output components such as a liquid crystal display and/or a light emitting diode indicator; one or more audio output components such as a speaker, an alarm, and/or a buzzer; and one or more mechanical output components such as a vibrating mechanism. The sensors 512 can be arranged within a sensor hub to manage one or more functions of the sensors. Example sensors 512 include, but are not limited to, proximity sensors (e.g., a light detecting sensor, an ultrasound transceiver, or an infrared transceiver), touch sensors, altitude sensors, an accelerometer, a tilt sensor, and a gyroscope, to name a few.

The memory component 508 represents one or more memory elements of any of a variety of forms, for example read-only memory, random access memory, static random access memory, dynamic random access memory, etc. In an embodiment, the processor 502 uses the memory component 508 to store and retrieve data. In some embodiments, the memory component 508 is integrated with the processor 502 into a single component such as on an integrated circuit. However, such a single component still usually has distinct portions/sections that perform the different processing and memory functions. The data that is stored by the memory component 508 includes, but need not be limited to, operating systems, programs (e.g., applications, protocols, and other code), and informational data.

For an embodiment, the user device (referred to as a first mobile device, e.g., UE-B) performs a method for enabling secondary distribution of content received from a server. The method includes sending, to a first server (e.g., 110), a first request (e.g., 214) for content identified by a first resource identifier (e.g., URI1) and sending, with the first request for content, a set of presence codes that each indicate proximity of a mobile device without identifying a user of the mobile device. The set of presence codes includes a first presence code (e.g., ProSe Code-B) for the first mobile device and at least a second presence code (e.g., ProSe Code-A and ProSe Code C) for a second mobile device (e.g., UE-A). The method further includes receiving (e.g., 226), from the first server, at least a second allocated resource identifier (e.g., URI-A) and the associated second presence code (e.g., ProSe Code A), wherein the second allocated resource identifier is different from the first resource identifier. Receiving the second allocated resource identifier and the associated second presence code redirects receipt of the first content from the server to the second mobile device. For example, sending each presence code includes sending a proximity-related services code allocated by a proximity services function (e.g., 120, 122) of a 3$^{rd}$ Generation Partnership Project network (e.g., PLMN-1, PLMN-2) subscribed to by at least one of the mobile devices to which the proximity-related services code was allocated or a user of the mobile device.

For a further embodiment, the method performed by the first mobile device includes receiving, from the server, a third allocated resource indicator (e.g., URI-B), which authorizes receipt of the first content when cached in the first mobile device. When the first mobile device receives, from a third mobile device, a second request for the first content, it sends the first content to the third mobile device when the first content is identified in the second request by the third allocated resource identifier (e.g., URI-B) associated with the first presence code (ProSe Code-B) for the first mobile device. Otherwise, the first mobile device withholds sending the first content to the third mobile device when the first content is identified in the second request by the first resource identifier (e.g., URI1).

For the embodiment where the set of presence codes includes one or more additional presence codes for one or more additional mobile devices, the method further includes sending, with the first request (214) for the first content, a set of quality indicators (e.g., QI-A, QI-C) indicating quality of communication between the first mobile device and the second mobile device and indicating quality of communication between the first mobile device and each of the one or more additional mobile devices. Alternatively, the first mobile device determines (at 308) set of quality indicators indicating quality of communication between the first mobile device and the second mobile device and indicating quality of communication between the first mobile device and each of the one or more additional mobile devices. The first mobile device receives (at 306) a plurality of allocated resource identifiers and associated presence codes, which includes the second allocated resource identifier. Each received allocated resource indicator authorizes receipt of the first content from a different one of the mobile devices having a presence code in the set of presence codes. The first mobile device then selects (at 308) based on the set of quality indicators, one of the received allocated resource identifiers and associated presence codes (e.g., URI-A/ProSe Code-A) for use in requesting (230) the first content from the mobile device to which the selected resource identifier was allocated.

Figure 6:
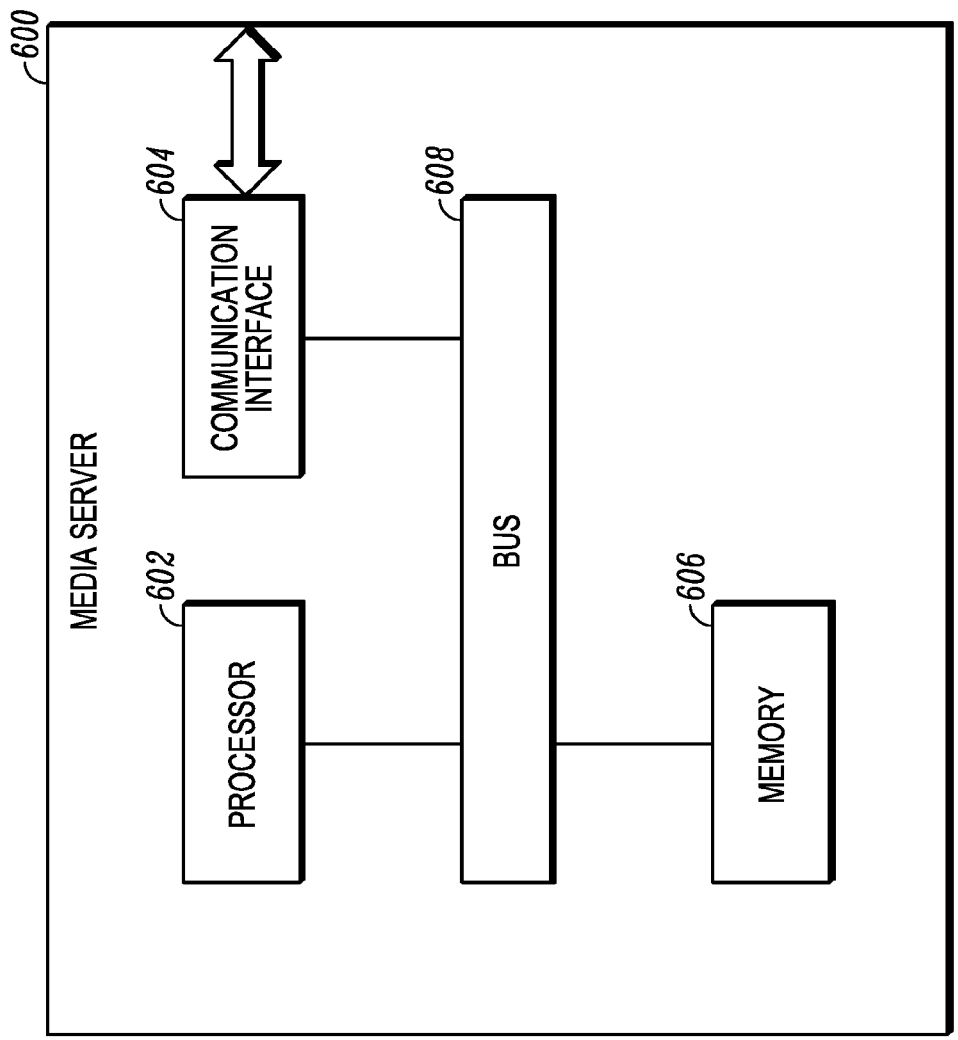
FIG. 6 is a block diagram illustrating internal hardware components of a media server configurable in accordance with some embodiments.

FIG. 6 shows a block diagram illustrating example internal hardware components of a server 600, for example media server 110 as illustrated in FIG. 1. As shown in FIG. 6, the internal hardware elements or components of the media server 600 include at least one of each of a processor 602, a communication interface 604, and a memory component 606. As further illustrated, the internal components of the media server 600 are operatively coupled to one another, and in communication with one another, by way of one or more internal communication links 608, for instance an internal bus. A limited number of device components 602, 604, 606, and 608 are shown for ease of illustration, but other embodiments may include a lesser or greater number of such components in the media server 600. Moreover, other well-known elements needed for a commercial embodiment of the media server 600 may be omitted from FIG. 6 for brevity.

In general, at a hardware level, the device components 602, 604, 606, and 608 function as described for the analogous device components 502, 506, 508, and 514, respectively, shown in FIG. 5. However, one or more of the device components 602, 604, 606, or 608 may have some additional features. The communication interface 604, for example, might support more simultaneous connections than the communication interface 506, and the processor 602 might be configured for a greater computational load as compared to the processor 502. Nonetheless, the media server 600 is configurable through one or more of its device components 602, 604, 606, and 608 to operate, for instance, as a media server in accordance with the embodiments described above by reference to the message sequence diagrams 200, 300, and 400 illustrated in FIGS. 2, 3, and 4.

For a particular embodiment, the server 600 is configured, e.g., by the operative coupling and collective configuration of its processor 602 and communication interface 604, to distribute content using a mobile device. Namely, the server 600 receives, from a first mobile device (e.g., UE-A), a first request (e.g., 204) for first content identified by a first resource identifier (e.g., URI1) and receives, with the first request for the first content, a first presence code (e.g., ProSe Code-A) that indicates proximity of the first mobile device without identifying a user of the first mobile device. The server 600 sends (e.g., at 208) the first content to the first mobile device. The server 600 also sends with the first content a second allocated resource identifier (e.g., URI-A) that is different than the first resource identifier (URI1). The second allocated resource identifier (URI-A) is associated with the first presence code (ProSe Code-A) for the first mobile device and enables receiving the first content cached in the first mobile device.

For another embodiment, the server 600 performs a method that includes receiving, from a different mobile device (e.g. UE-B or a requesting mobile device), a request (e.g., 214, 302, or 402) for the first content identified by the first resource identifier (URI1). The server 600 receives with the request for the first content, a set of presence codes that each indicate proximity of a mobile device without identifying a user of the mobile device. The set of presence codes includes a presence code (e.g., ProSe Code-B) for the requesting mobile device (UE-B) and at least one other presence code for one or more mobile devices in proximity to the requesting mobile device. The server 600 selects (e.g., 220, 304, or 404) a set of allocated resource identifiers associated with one or more presence codes, in the set of presence codes, for one or more of the mobile devices in proximity to the requesting mobile device having the first content cached therein. Each allocated resource identifier in the set is different than the first resource identifier (URI1). The server 600 sends (e.g., at 214, 306, or 408), to the requesting mobile device, the set of allocated resource identifiers and associated presence codes for use in retrieving the first content cached in at least one of the mobile devices in proximity to the requesting mobile device.

For a further embodiment, the method performed by the server 600 includes successfully validating (e.g., 216, 218) the presence code (ProSe Code-B), and the set of allocated resource identifiers and associated presence codes is sent to the requesting mobile device in response to successfully validating the presence code. For example, successfully validating the presence code includes exchanging messaging (216) between the server and a first proximity services function (e.g., ProSe Function-1) within a first $3^{rd}$ Generation Partnership Project network (e.g., PLMN-1) with which the server is authorized to communicate. Moreover, successfully validating the presence code can further include a message exchange (218) between the first proximity services function and a second proximity services function (e.g., ProSe Function-2) within a second $3^{rd}$ Generation Partnership Project network (e.g., PLMN-2) subscribed to by at least one of the requesting mobile device or a user of the requesting mobile device. Furthermore, selecting the set of allocated resource identifiers can further include (e.g., at 310 and/or 224) one or both of: validating the one or more presence codes for the one or more mobile devices in proximity to the requesting mobile device having the first content cached therein; or verifying that the one or more mobile devices in proximity to the requesting mobile device having the first content cached therein are authorized for proximity communications.

For an embodiment, e.g., by reference to FIG. 2, the set of allocated resource identifiers and associated presence codes contains only a single allocated resource identifier and associated presence code (e.g., URI-A/ProSe Code-A). For this embodiment, the method further includes receiving, with the request for the first content, a plurality of quality indicators. Each QI indicates quality of communication between the requesting mobile device and a different one of the mobile devices in proximity to the requesting mobile device, which has a presence code in the set of presence codes. The single allocated resource identifier and associated presence code is selected (220), based on the plurality of quality indicators, from multiple allocated resource identifiers and associated presence codes for multiple mobile devices in proximity to the requesting mobile device having the first content cached therein. For another embodiment, e.g., by reference to FIG. 3, the set of allocated resource identifiers and associated presence codes includes multiple allocated resource identifiers and associated presence codes. This enables the requesting mobile device to select (308) a single one of the multiple allocated resource identifiers and associated presence codes for use in retrieving (230, 232) the first content cached in one of the mobile devices in proximity to the requesting mobile device.

For yet another embodiment, e.g., by reference to FIG. 4, the first content is a first object (e.g., Object 1) referred to in the request (402). In one example, the request (402) is for a web page referring to the first content as the first object. The request (402) can also include other objects (e.g., objects 2-5). In this case, the set of allocated resource identifiers can include at least second and third allocated resource identifiers and associated second and third presence codes (e.g., URI-A/ProSe Code-A and URI-C/ProSe Code-C), of the set of presence codes, for use in retrieving the first and second objects (e.g., Objects 1 and 2) from two different mobile devices in proximity to the requesting mobile device.

For a particular implementation, sending the set of allocated resource identifiers includes sending a content response (408) to the requesting mobile device that includes, as a first link to the first object, a second allocated resource identifier and associated second presence code (URI-A/ProSe Code-A), of the set of presence codes, for use in retrieving the first content from a second mobile device (UE-A) in proximity to the requesting mobile device. Where the request also refers to a second object (e.g., Objects 3, 4, and/or 5), the content response (408) also includes, as a second link the second object, a third resource identifier for use in retrieving the second content from the server or another non-mobile device entity.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method performed by a first mobile device for enabling distribution of content received from a server, the method comprising:
    sending, to the server, a first request for first content identified by a first resource identifier, wherein the first content comprises a first object referred to in the first request, and wherein the first request also refers to a second object;
    sending, with the first request for the first content, a set of presence codes that each indicate proximity of a mobile device without identifying a user of the mobile device, wherein the set of presence codes includes a first presence code for the first mobile device and at least one other presence code for one or more mobile devices in proximity to the first mobile device;
    receiving, from the server, a set of allocated resource identifiers associated with one or more presence codes in the set of presence codes, for one or more of the mobile devices in proximity to the first mobile device having the first content cached therein, wherein each allocated resource identifier in the set is different than the first resource identifier, and wherein the set of allocated resource identifiers includes second and third allocated resource identifiers and associated second and third presence codes, of the set of presence codes, to retrieve the first and second objects from two different mobile devices in proximity to the first mobile device; and
    retrieving the first content cached in the one or more mobile devices in proximity to the first mobile device, based on the set of allocated resource identifiers and associated presence codes.

2. The method of claim 1, wherein sending each presence code comprises sending a proximity-related services code allocated by a proximity services function of a 3rd Generation Partnership Project network subscribed to by at least one of the mobile devices to which the proximity-related services code was allocated or a user of the mobile device.

3. The method of claim 1, wherein the set of allocated resource identifiers and associated presence codes contains only a single allocated resource identifier and associated presence code, the method further comprising:
    sending, with the first request for the first content, a plurality of quality indicators that each indicates quality of communication between the first mobile device and a different one of the mobile devices in proximity to the first mobile device, which has a presence code in the set of presence codes.

4. The method of claim 1, wherein the set of allocated resource identifiers and associated presence codes includes multiple allocated resource identifiers and associated presence codes, the method further comprising:
    selecting a single one of the multiple allocated resource identifiers and associated presence codes for use in retrieving the first content cached in one of the mobile devices in proximity to the first mobile device.

5. The method of claim 1, wherein receiving the set of allocated resource identifiers comprises receiving a content response from the server that includes, as a first link to the first object, a fourth allocated resource identifier and associated fourth presence code, of the set of presence codes;
    wherein retrieving the first content comprises retrieving the first content from a second mobile device in proximity to the first mobile device using the fourth allocated resource identifier and associated fourth presence code.

6. The method of claim 5, wherein the content response also includes, as a second link to the second object, a fifth resource identifier;
    the method further comprising retrieving second content from the server or another non-mobile device entity using the fifth resource identifier.

7. The method of claim 1, wherein the first request is for a web page referring to the first content as the first object.

8. A mobile device configured for enabling distribution of content received from a server, the mobile device comprising:
    a processor and communication interface operatively coupled and collectively configured to:
        send, to the server, a first request for first content identified by a first resource identifier, wherein the first content comprises a first object referred to in the first request, and wherein the first request also refers to a second object;
        send, with the first request for the first content, a set of presence codes that each indicate proximity of a mobile device without identifying a user of the mobile device, wherein the set of presence codes includes a first presence code for the first mobile device and at least one other presence code for one or more mobile devices in proximity to the first mobile device;
        receive, from the server, a set of allocated resource identifiers associated with one or more presence codes in the set of presence codes, for one or more of the mobile devices in proximity to the first mobile device having the first content cached therein, wherein each allocated resource identifier in the set is different than the first resource identifier, and wherein the set of allocated resource identifiers includes second and third allocated resource identifiers and associated second and third presence codes, of the set of presence codes, to retrieve the first and second objects from two different mobile devices in proximity to the first mobile device; and retrieve the first content cached in the one or more mobile devices in proximity to the first mobile device, based on the set of allocated resource identifiers and associated presence codes.

9. The mobile device of claim 8, wherein the processor and the communication interface are operatively coupled and collectively configured to send each presence code by sending a proximity-related services code allocated by a proximity services function of a 3rd Generation Partnership Project network subscribed to by at least one of the mobile devices to which the proximity-related services code was allocated or a user of the mobile device.

10. The mobile device of claim 8, wherein the set of allocated resource identifiers and associated presence codes contains only a single allocated resource identifier and associated presence code, wherein the processor and the communication interface are operatively coupled and collectively configured to further:

send, with the first request for the first content, a plurality of quality indicators that each indicates quality of communication between the first mobile device and a different one of the mobile devices in proximity to the first mobile device, which has a presence code in the set of presence codes.

11. The mobile device of claim 8, wherein the set of allocated resource identifiers and associated presence codes includes multiple allocated resource identifiers and associated presence codes, wherein the processor and the communication interface are operatively coupled and collectively configured to further:

select a single one of the multiple allocated resource identifiers and associated presence codes for use in retrieving the first content cached in one of the mobile devices in proximity to the first mobile device.

12. The mobile device of claim 8, wherein the processor and the communication interface are operatively coupled and collectively configured to receive the set of allocated resource identifiers by receiving a content response from the server that includes, as a first link to the first object, a fourth allocated resource identifier and associated fourth presence code, of the set of presence codes, wherein the processor and the communication interface are operatively coupled and collectively configured to:

retrieve the first content by retrieving the first content from a second mobile device in proximity to the first mobile device using the fourth allocated resource identifier and associated fourth presence code.

13. The mobile device of claim 12, wherein the content response also includes, as a second link to the second object, a fifth resource identifier, wherein the processor and the communication interface are operatively coupled and collectively configured to further:

retrieve second content from the server or another non-mobile device entity using the fifth resource identifier.

14. The mobile device of claim 8, wherein the first request is for a web page referring to the first content as the first object.

* * * * *